United States Patent
Sweeny et al.

(10) Patent No.: US 12,084,180 B2
(45) Date of Patent: Sep. 10, 2024

(54) PASSIVE SAFETY SYSTEM

(71) Applicant: Flirtey Holdings, Inc., Reno, NV (US)

(72) Inventors: Matthew Sweeny, Reno, NV (US);
John R Foggia, Reno, NV (US);
Jeremy Fries, Reno, NV (US)

(73) Assignee: Flirtey Holdings, Inc., Reno, NV (US)

( * ) Notice: Subject to any disclaimer, the term of this patent is extended or adjusted under 35 U.S.C. 154(b) by 527 days.

(21) Appl. No.: 17/113,896

(22) Filed: Dec. 7, 2020

(65) Prior Publication Data

US 2021/0107646 A1 Apr. 15, 2021

Related U.S. Application Data

(63) Continuation of application No. PCT/US2019/035624, filed on Jun. 5, 2019.

(60) Provisional application No. 62/680,925, filed on Jun. 5, 2018.

(51) Int. Cl.
| | |
|---|---|
| B64C 39/02 | (2023.01) |
| B64D 25/00 | (2006.01) |
| B64U 10/13 | (2023.01) |
| B64U 30/20 | (2023.01) |
| B64U 50/19 | (2023.01) |

(52) U.S. Cl.
CPC ............ *B64C 39/024* (2013.01); *B64D 25/00* (2013.01); *B64D 2201/00* (2013.01); *B64U 10/13* (2023.01); *B64U 30/20* (2023.01); *B64U 50/19* (2023.01)

(58) Field of Classification Search
CPC ..... B64C 39/024; B64C 27/006; B64D 25/00; B64D 2201/00; B64D 50/19; B64U 10/13; B64U 30/20
See application file for complete search history.

(56) References Cited

U.S. PATENT DOCUMENTS

| | | | |
|---|---|---|---|
| 9,613,539 B1 * | 4/2017 | Lindskog | G08G 5/0069 |
| 9,919,797 B2 | 3/2018 | Chan et al. | |
| 10,000,284 B1 * | 6/2018 | Purwin | G05D 1/104 |
| 11,046,443 B2 * | 6/2021 | Tanriover | E05B 81/08 |
| 11,173,997 B2 * | 11/2021 | Toyama | B64B 1/02 |
| 11,524,772 B1 * | 12/2022 | Cecil | B64C 25/56 |
| 2016/0332739 A1 * | 11/2016 | Wong | B64C 39/024 |
| 2017/0174343 A1 | 6/2017 | Erickson et al. | |
| 2017/0267347 A1 * | 9/2017 | Rinaldi | B65D 81/18 |
| 2017/0334579 A1 * | 11/2017 | Hartkop | B64D 47/08 |

(Continued)

FOREIGN PATENT DOCUMENTS

| | | | | |
|---|---|---|---|---|
| CN | 206087286 U | * | 4/2017 | |
| CN | 108082460 A | * | 5/2018 | ............. B64C 25/62 |

(Continued)

OTHER PUBLICATIONS

International Search Report and Written Opinion dated Sep. 5, 2019 for PCT Application No. PCT/US2019/035624.

*Primary Examiner* — Benjamin P Lee
(74) *Attorney, Agent, or Firm* — EIP US LLP

(57) ABSTRACT

In an embodiment an unmanned aerial vehicle comprises a central body and a plurality of support structures extending outwards from the central body. Each support structure supports a rotor blade assembly and is provided with one or more deformable portions. The rotor blade assembly defines a rotational axis of one or more rotor blades associated with the rotor blade assembly.

21 Claims, 12 Drawing Sheets

(56) References Cited

U.S. PATENT DOCUMENTS

| | | | | |
|---|---|---|---|---|
| 2017/0341776 A1* | 11/2017 | McClure | ............ | G01C 21/1656 |
| 2018/0022310 A1* | 1/2018 | Olson | ................... | B64C 25/56 |
| | | | | 244/100 A |
| 2019/0112044 A1* | 4/2019 | Overall | ................... | B64C 27/08 |
| 2019/0127066 A1* | 5/2019 | Tournet | ..................... | B64C 1/34 |
| 2019/0202549 A1* | 7/2019 | Zhang | ................... | H04N 23/51 |
| 2020/0094962 A1* | 3/2020 | Sweeny | ............... | B64C 39/024 |
| 2020/0223558 A1* | 7/2020 | Feng | ....................... | G01P 1/023 |
| 2020/0231291 A1* | 7/2020 | Wakatsuki | ............. | B64D 45/00 |
| 2020/0283136 A1* | 9/2020 | Nguyen | .................... | H04L 9/50 |
| 2021/0240207 A1* | 8/2021 | Gury | ..................... | G05D 1/101 |
| 2021/0339845 A1* | 11/2021 | Milan | ................... | B64D 45/00 |
| 2022/0017220 A1* | 1/2022 | Bae | ...................... | A47L 9/2842 |
| 2022/0185444 A1* | 6/2022 | Huebner | ................ | B64C 27/20 |
| 2022/0396369 A1* | 12/2022 | Hartkop | ............... | B64C 39/024 |
| 2023/0009190 A1* | 1/2023 | Stevens | ................. | B64D 47/00 |

FOREIGN PATENT DOCUMENTS

| | | | | |
|---|---|---|---|---|
| CN | 110254698 B | * | 7/2020 | |
| DE | 202015006282 U1 | | 1/2016 | |
| DE | 102015218456 A1 | * | 3/2017 | |
| JP | 6217054 B1 | * | 10/2017 | ........... B60R 21/237 |
| KR | 2213282 B1 | * | 2/2021 | ........... B25J 18/025 |
| WO | 2015200209 A1 | | 12/2015 | |
| WO | WO-2018084125 A1 | * | 5/2018 | ........... B60R 21/237 |
| WO | 2019077070 A1 | | 4/2019 | |

\* cited by examiner

PASSIVE SAFETY SYSTEM

CROSS-REFERENCE TO RELATED APPLICATIONS

This application is a continuation of International Application No. PCT/US2019/035624, filed Jun. 5, 2019 which claims priority to U.S. Provisional Application No. 62/680,925, filed Jun. 5, 2018, under 35 U.S.C. § 119(a). Each of the above-referenced patent applications is incorporated by reference in its entirety.

BACKGROUND OF THE INVENTION

Field of the Invention

The present disclosure relates to an unmanned aerial vehicle having a passive safety system.

Description of the Related Technology

Unmanned aerial vehicles (UAVs), such as drones, are autonomous and/or remotely operated aerial vehicles. UAVs may be configured to fly using fixed wings or rotors and blades. There are a wide variety of faults that can occur during operation of a UAV. These include power loss, communication loss, mechanical breakage and circuit failure. In some cases, these faults can result in the unexpected descent of the UAV, such that it falls to the ground. Such an unexpected descent can pose a threat to the safety of humans who may be located below the descending UAV. Some known UAVs use parachutes to minimize the descent velocity during an unexpected descent; the parachute may be deployed manually or automatically, for example in response to a trigger. In some automatic deployment systems, the fault which led to the unexpected descent could also hinder the automatic deployment of the parachute, leading to a failed parachute deployment. And, even if the parachute is deployed correctly, the descent velocity may in any event be sufficiently great to cause injury.

During flight, a UAV may pose a threat to other aerial vehicles, such as aeroplanes, crop sprayers, helicopters and other UAVs. For example, a human operator may cause a UAV to collide with another aerial vehicle. Alternatively, an autonomous UAV may enter into the flight path of the other aerial vehicle. In extreme cases the collision may result in injury or death to passengers onboard the other aerial vehicle. Geofencing has been proposed as one solution to mitigate in-air collisions between aerial vehicles. However, a malicious operator could override these safety systems. Some UAVs use "blade guards" to reduce the likelihood of a human being injured by the UAV's rotating blades. However, because these guards protect the blades, they are generally inadequate to protect against damage from the more substantial chassis and rotor blade support structures, which are more likely to damage other aerial vehicles when compared to the relatively fragile rotating blades.

Accordingly, there is a need for an improved UAV safety system which provides protection in the event of collisions.

SUMMARY

According to an aspect of the present disclosure, there is provided an unmanned aerial vehicle (UAV) comprising a central body; and a plurality of support structures extending outwards from the central body, wherein each said support structure supports a rotor blade assembly, the rotor blade assembly defining a rotational axis of one or more rotor blades associated with the rotor blade assembly, and wherein each said support structure is provided with one or more deformable portions.

UAVs according to embodiments described herein therefore comprise support structures configured with one or more deformable portions, which provide protection during a collision. A portion, or substantially all, of the support structure may be rigid, for example. The deformable portions may be considered to be deformable zones that take the form of any one or a combination of deformable padding, crumple zones, and (a) deployable air bag(s). Generally, the portions may comprise one or more materials which are configured to deform when sustaining an impact, and thereby absorb energy during a collision. In some examples, at least one of the materials within the deformable portions is configured to permanently deform during the collision. The deformation of the portions slows down the deceleration of the UAV (by increasing the deceleration time) which reduces the force experienced by the entity which collides with the support structure of the UAV. Thus, the one or more deformable portions provide protection during impact, which reduces the likelihood of injury and/or damage. In other embodiments the one or more deformable portions are reusable, for example with regard to deformable padding and crumple zones, these "temporarily deform", and with regard to the air bag, this can be repacked after use and used again.

The UAV comprises a central body having a number of such support structures extending outwards from the central body. The or each support structure may be a single component or a plurality of components, each being movably hinged together. In one example, the deformable portion(s) and support structure are separate components. In some examples the one or more deformable portions cover at least a portion of the support structure, and in other examples the one or more deformable portions cover the entirety of the UAV. In another example, the deformable portion(s) and support structure are parts of a unitary entity. For example, a material may vary in rigidity in cross section. Such a material, for example, may provide a support structure having a rigid inner portion and a deformable outer portion. The outer portion therefore forms the deformable portion(s). Example materials having a non-continuous rigidity may be 3D printed.

Located at a point along each support structure is a rotor blade assembly, which generates lift to keep the UAV airborne. For example, each rotor blade assembly may comprise one or more rotor blades which are caused to rotate about a rotational axis. The rotational axis may be aligned substantially vertically when the UAV hovers in mid-air.

The central body may house electronic components, such as electronic circuitry and a power source. The central body may be located at the geometric centre of UAV, and/or at the centre of mass of the UAV. In one example the central body comprises a payload container to temporarily house a payload during transportation by the UAV. The central body is otherwise referred to as a mounting body, to which components of the UAV can be mounted.

In an example, the one or more rotor blades are mounted on an upper side of the support structure, and the one or more deformable portions comprise at least a padding portion which is located on an underside of the support structure. This construction therefore protects a human, located underneath the UAV, during an unexpected descent of the UAV. The "upper side" is the top surface of the support structure, and therefore generally faces skywards, during flight. Conversely, the "underside" is the bottom surface of the support structure, and therefore generally faces towards the ground, during flight. The padding portion may be located substantially along the full length of the support structure or may be located at one or more positions along the underside of the support structure.

In an example, the rotor blade assembly comprises a motor housing defining the rotational axis and mounted in a mounting section of the support structure; the padding portion comprises a mounting section portion located below the motor housing, and the rotational axis passes through the mounting section portion. The phrase "below the motor housing" means "located on an underside of the motor housing" in this disclosure. In this way the motor housing is affixed to the support structure at a location along the support structure known as the mounting section. In one example, the mounting section is located at the distal end of the support structure. The motor housing may comprise a motor which causes the blades of the rotor blade assembly to rotate to generate lift, as noted above. The relatively large mass of the motor is capable of generating a large impact force during a collision, so the mounting section portion of the padding protects a human or other object during a collision with the motor housing.

In one arrangement, the mounting section portion comprises a recess formed therein, and the recess houses at least a part of the motor housing. The padding—in which the mounting section is disposed—therefore has a cavity within which part of the motor housing is located. This recess allows at least part of the motor housing to be covered and surrounded by the padding. The padding therefore not only provides protection on an underside of the motor housing, it can also provide protection to one or more lateral sides of the motor housing. This provides protection if the UAV is descending in altitude while also rotating about the roll axis and/or the pitch axis. Hence, if the motor housing is contained within the recess, protection is improved further.

In addition, the recess can also provide a means to improve the quality of the attachment of the padding to the UAV. By being received within the recess, the padding surrounds the motor housing on at least one of its sides, which means that a force applied to the padding in a direction perpendicular to the rotational axis is less likely to displace the padding. Furthermore, the recess may also act to insulate electrical components of the UAV against cold temperatures.

In an example, the mounting section portion has a cross-section which is substantially concentric with the rotational axis and has a profile which tapers downwards towards a lower surface of the mounting section portion. The cross-section is in a plane arranged perpendicular to the rotational axis. The mounting section portion is therefore located below the rotor blades and has its centre substantially aligned with the rotational axis. This position is chosen to minimise the impact on the aerodynamics of the UAV. By being concentric with the rotational axis, the airflow around the mounting section portion is only minimally disrupted. Similarly, the tapered outer profile of the mounting section means that air can flow around the mounting section without excessive drag. Furthermore, a tapered shape avoids unnecessary "over-use" of padding material. In sum, the design enables optimisation of the overall mass, aerodynamics and safety performance of the UAV. In the present disclosure the phrase "tapers downwards towards a lower surface" means that the width of the mounting section portion, measured in one or more directions perpendicular to the rotation axis, narrows in a direction towards the ground, in a direction away from the rotational plane of the rotor blades.

In one arrangement, the mounting section is located at a distal end of the support structure and the support structure comprises an elongate mid-section connecting the central body to the mounting section, while the padding comprises an elongate portion which is located on at least an underside of the elongate mid-section. The padding therefore covers the mounting section of the support structure and an elongate mid-section of the of the support structure, so that a more complete safety system can be provided.

Preferably, the elongate portion extends below the lower surface of the support structure by a first depth dimension and the mounting section portion extends below the lower surface of the support structure by a second depth dimension, the first and second depth dimensions being measured in a direction parallel to the rotational axis, and wherein the second depth dimension is greater than the first depth dimension. The padding can therefore have a depth/thickness which varies along the length of the padding, and more particularly is deeper below the rotor blade assembly mounting section than below the elongate mid-section of the support structure. Typically, the mounting section has a greater mass than the other parts of the support structure, so damage caused during a collision can be reduced by providing the padding with a thicker depth at this location. In some examples the mounting section may also comprise a sensor device such as a camera, so additional padding is required to protect against contact with the camera.

In an example, the support structure extends outwards along a support axis which is substantially perpendicular to the rotational axis, the elongate portion has a first width dimension and the mounting section portion has a second width dimension, the first and second width dimensions are measured in a direction perpendicular to both the rotational axis and the support axis, and the second width dimension is greater than the first width dimension. In this way the padding can have a width which varies across the length of the padding, for example, the padding may be wider at the mounting section than it is at the elongate mid-section of the support structure. In some example UAVs the support structure may have a width that is narrower than components of the rotor blade assembly, in which case, and to ensure adequate protection, the padding may be wider at the mounting section. The narrower width of the elongate portion also minimises the impact on the aerodynamics of the UAV. For example, the narrower width reduces the aerodynamic drag during flight when compared to an elongate portion having a width the same as the wider mounting section portion.

In one arrangement the elongate portion and the mounting section portion of the padding are unitary. This can ensure protection is provided at all positions between the elongate mid-section and the mounting section. In another example however, these portions form separate parts that may or may not be connected. By having separate parts, the overall weight of the UAV can be reduced. In an example, a gap between the elongate portion and the mounting section portion is less than about 5 cm, which is small enough to ensure the exposed section of the support structure would not directly impact a human should the UAV experience an unexpected descent.

As noted above, the padding may comprise a recess formed therein, and in certain embodiments the recess houses a sensor device carried by the UAV. For example, an underside of the padding may comprise the recess, so that the sensor device may monitor a region directly below the UAV. In another example, a lateral surface of the padding may comprise the recess. The sensor device may be a camera device, a LIDAR, or a RADAR, for example. In these arrangements the recess contains the sensor device such that the sensor device does not substantially protrude out of the recess. As a result, in the event that the UAV collides with an entity, the likelihood of the sensor device directly impacting the impact is reduced.

In some examples the sensor device may have an outer profile which has a poor aerodynamic shape, in that it has a high drag coefficient. By housing the sensor device within the recess, the UAV may perform better aerodynamically that it would if the sensor device were exposed. It can therefore be more effective, cost-wise and/or aerodynamically, to house the camera within padding which has a low drag coefficient than to obtain a sensor device which has a low drag coefficient itself.

In embodiments in which mounting section portion comprises a recess formed therein, and the recess houses the sensor device, the sensor device and the motor housing may be collocated within the mounting section portion of the padding. In some configurations, the air forced downwards by the rotor blades may be less below the motor housing. Hence, to minimise impact on the aerodynamics and efficiency of flight, the sensor device can be located below the motor housing.

The recess may be substantially coaxial with the rotational axis, in which case the sensor device can be arranged to be coaxial with the rotational axis where air flow is minimal, which can reduce any vibrations experienced by the sensor device.

In an example, an aperture, or through hole, extends through the mounting section portion. The aperture may be formed inside the recess and extend through the padding to allow the passage of wires. For example, wires may extend between the sensor device and the central body of the UAV. These wires may extend along the support structure and through the aperture to the sensor device disposed within the recess.

Advantageously, the mounting section portion comprises a stabilising portion configured to engage a surface, such as the ground, when the central body of the UAV is in contact with the surface and when the UAV is rotated about a tipping axis. This assists in preventing the rotor blades from colliding with the surface in certain situations. For example, the padding—which is located on an underside of the support structure—can extend below the underside by a depth dimension sufficient to provide the stabilising portion. The stabilising portion is therefore configured to support the UAV if it e.g. experiences an unexpected descent and lands in a manner which causes the UAV to tip over. As will be appreciated, in these circumstances it is highly desirable to stop the rotor blades from colliding with the ground, since, if the rotor blades are still spinning, contact with the ground may cause the UAV to move along the surface, or they may break and shatter, which can cause shards of material to be ejected and injure any bystanders. The stabilising portion therefore contacts the ground to instead of the rotor blades.

In one example, the stabilising portion is located towards a distal end of the support structure. At this position the padding can have a shorter depth dimension, thereby reducing mass and drag. In contrast, should the stabilising portion be provided closer to the central body, the depth of the padding would need to be greater to ensure it engages the surface before the rotor blades.

In some arrangements the UAV comprises a rigid surface at a distal end of the support structure, the rigid surface facing away from the central body, and the padding comprises an outer padding portion, the outer padding portion extending beyond the rigid surface in a direction parallel to the support axis. The support axis may be perpendicular to the rotational axis. The outer padding portion therefore protects an entity during a collision by stopping the entity from directly impacting the rigid surface of the support structure.

The outer padding portion is particularly useful in the event of an in-air collision with an aerial vehicle. It has been found that providing the outer padding portion significantly reduces the likelihood of e.g. the rotors from breaking an aeroplane window.

In an example, the extension of the outer padding portion beyond the rigid surface has a thickness, measured parallel to the support axis, of less than 10 cm. This provides a good balance between protection and aerodynamics. By contrast, increasing the thickness much beyond 10 cm can begin to compromise aerodynamics to an extent which outweighs any additional protection provided.

Typically, rotor blades are structurally weak compared to the support structure. As such, they do not significantly contribute to the damage caused during a mid-air collision meaning that the outer padding portion need not extend beyond the rotor blades Accordingly, the free end of each of the at least one rotor blade may extend beyond the outer padding portion in the direction parallel to the support axis The padding preferably comprises an inner deformable layer formed of a deformable material and an outer layer formed of a flexible material. The inner deformable layer is provided to absorb energy during the collision, and the outer layer is provided to bend upon impact to further increase the deceleration time. The outer layer may also provide additional advantages, for example it may be waterproof and/or may form a smooth outer surface with a lower coefficient of drag when compared to the deformable material.

In some arrangements, the padding covers at least a portion of a lateral surface of the support structure, in which case the padding can provide protection during a collision when the UAV is moving laterally. For example, the UAV may be descending at an angle towards the ground, rather than descending vertically. The padding covering the lateral surface therefore provides protection during a collision in instances when the UAV has a component of lateral motion. A "lateral surface" may mean a "side portion". In some examples the padding may cover all side portions of the support structure.

In an example, an inner surface of the padding conforms to a portion of an outer surface of the support structure. Such a construction allows the secure attachment of the padding to the support structure. In this way the padding forms a sleeve which surrounds the support structure. The padding may define a channel or groove within which the support structure is received.

Further features and advantages of the disclosure will become apparent from the following description of preferred embodiments of the disclosure, given by way of example only, which is made with reference to the accompanying drawings.

DETAILED DESCRIPTION OF CERTAIN INVENTIVE EMBODIMENTS

Conventional unmanned aerial vehicles (UAVs), such as drones, include a chassis upon which are mounted one or more rotor blades which generate lift. In many consumer UAVs the chassis are constructed from a relatively inexpensive and lightweight material, such as plastic. Recently, logistics and retail businesses have begun realising the potential of UAVs for the automated delivery of goods to customers. To enable the delivery of large payloads over great distances, the UAVs need to be scaled up in size to enable the transport of the payload, and house larger power sources, motors, rotor blades and additional onboard electronic systems not present in consumer UAVs. This means that a lightweight plastic chassis is unsuitable to support the increased mass of the UAV during flight. Accordingly, these commercial UAVs require a stronger, more rigid chassis made from materials such as metal, meaning these commercial UAVs can have masses of around 10 to 20 kgs, or more.

With UAV deliveries in urban areas set to become more commonplace, stringent safety systems are required to ensure the safety of humans in the event that these commercial UAVs malfunction and fall to the ground, or collide with another aerial vehicle, such as an aeroplane.

Disclosed is a passive safety system for a UAV, such as a drone, that reduces injury and alleviates damage caused during a collision with an entity such as a human or aeroplane. In an example, the passive safety system comprises deformable padding. For example, the padding may be configured to cover at least a portion of the UAV's chassis, or the chassis may itself have an outer portion forming padding. For example, the padding is configured to protect an underside of a rigid portion of a support structure to protect the head or upper body of a human, should the UAV experience a loss of lift and fall to the ground. In another example, the padding is configured to extend beyond a distal end of the support structure of the chassis to mitigate damage caused during an in-air collision with an aerial vehicle, such as an aeroplane.

Figure 1:
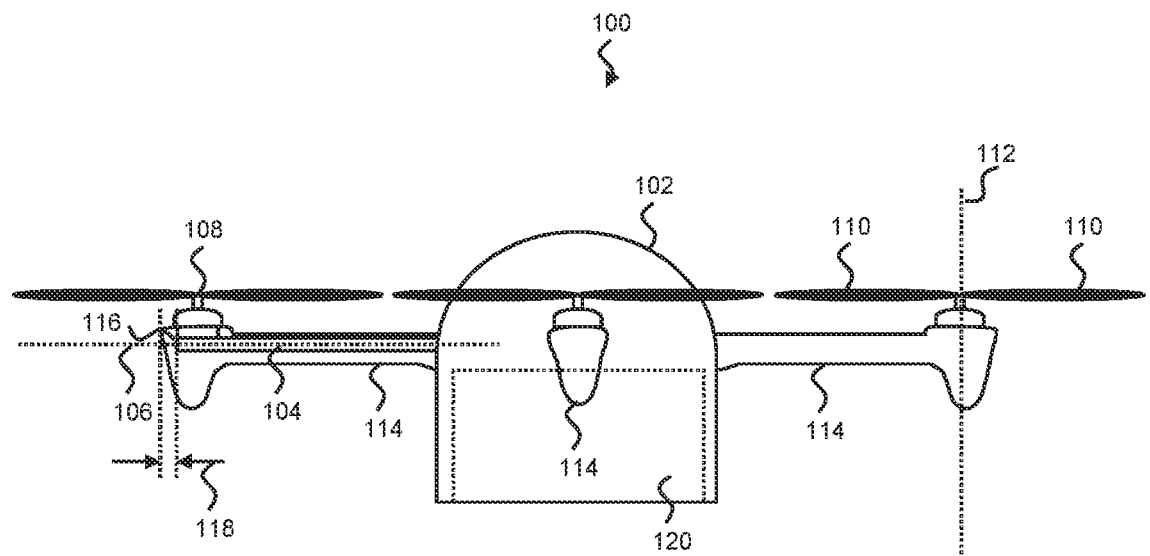
FIG. 1 is a side view of an unmanned aerial vehicle comprising padding in accordance with an example.

FIG. 1 is a side view of a UAV, or drone, comprising a passive safety system, consistent with a particular example. The UAV 100 comprises a body 102, a plurality of rigid support structures 104 which extend outwards and away from the body 102, along a support axis 106 defined by the rigid support structure 104. In this example the rigid support structure is made from metal, however other rigid materials may be used. For example, the support structure 104 may be made of a material which can be 3D printed. The UAV 100 comprises four rigid support structures 104 in this example, each supporting a rotor blade assembly 108. The UAV 100 may therefore be referred to as a "quadcopter". In other examples, however, the UAV 100 may comprise two, three, five or more rigid support structures and a corresponding number of rotor blade assemblies 108. Each rotor blade assembly 108 is connected directly or indirectly to a respective rigid support structure 104 in a mounting section. In this example the rotor blade assemblies 108 are mounted towards a distal end of the rigid support structures 104, however they may be mounted at any location along the length of the support structure 104.

A rotor blade assembly 108, in general, comprises a motor housing and one or more rotor blades 110. The motor housing generates rotational motion which in turn causes the one or more rotor blades 110 to rotate about a rotational axis 112 to generate lift. By controlling the rotational velocity of the rotor blades 110 associated with each rotor blade assembly 108, the UAV 100 can be configured to hover, or fly in a particular direction. The rotor blade assembly 108 may also comprise a mount, which supports other components of the rotor blade assembly 108 and couples the rotor blade assembly 108 to the rigid support structure 104. While the support axis 106 is illustrated as being perpendicular to the rotational axis 112, the support axis 106 may be angled with respect to the rotational axis 112 in some examples.

Figure 2:
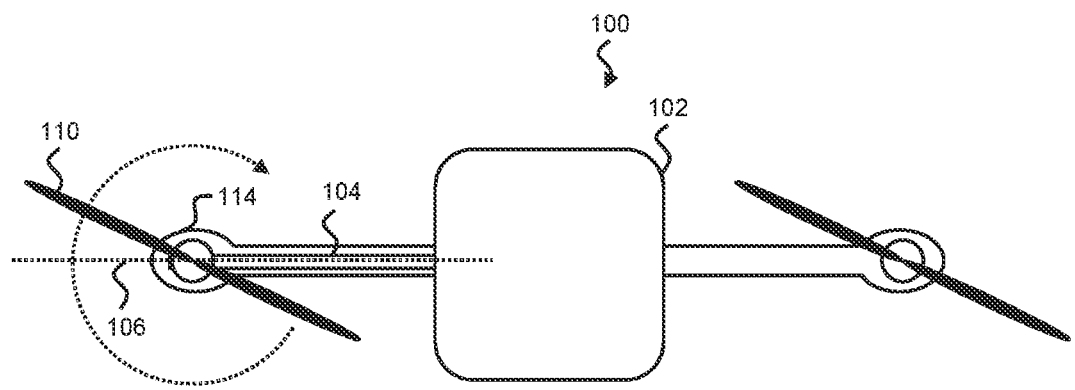
FIG. 2 is a plan view of the unmanned aerial vehicle of FIG. 1.

FIG. 2 is a plan view of the UAV 100 of FIG. 1. The rotational axis 112 extends into the page, in the downwards direction towards the ground. The one or more rotor blades 110 therefore rotate in a plane arranged perpendicular to the rotational axis 112. In FIG. 2, only two of the four rigid support structures 104 are shown for clarity.

Embodiments of the passive safety system according to the present disclosure comprise deformable padding 114. For example, the deformable padding 114 may cover at least a portion of a respective rigid support structure 104. Alternatively the support structure 104 may not be entirely rigid. For example, the support structure may comprise an inner rigid portion and a deformable portion which forms the deformable padding. In FIG. 1, for illustrative purposes, the left-hand side padding 114 is shown in cross section, to show the rigid support structure 104 within the padding 114. The right-hand side rigid support structure 104 is obscured from view because it is entirely covered by the padding 114. In this example, the padding 114 is installed on an underside of the rigid support structure 104 to ensure that the rigid support structure 104 does not directly impact an entity, such as human, should the UAV experience an unexpected descent. The padding 114 is therefore configured to absorb energy and deform during impact with the entity to reduce any damage caused to the entity. The padding 114 extends below the underside of the rigid support structure 104 by a certain depth dimension, such as 5 cm, 10 cm, or 15 cm. Other suitable depth dimensions may be chosen depending upon factors such as the mass of the UAV 100 and any payload, the material of the padding 114, and the flight altitude.

In the example of FIG. 1, the padding 114 also extends beyond the distal end of the rigid support structure 104 to ensure that a rigid surface 116 at the distal end of the rigid support structure 104 does not directly impact an entity, such as an aeroplane. An outer padding portion of the padding therefore extends beyond the rigid surface 116 in a direction parallel to the support axis 106. Again, this outer padding portion is configured to deform upon impact with the entity to reduce damage to the entity. The outer padding portion has a thickness 118, measured in a direction along the support axis 106. In one example, the thickness 118 is equal to or less than 10 cm.

The padding 114 can be made of any deformable material that absorbs energy upon impact. For example, the padding 114 may comprise a foam, such as vinyl nitrile or an expanded polymer which includes expanded polystyrene (EPS) or expanded polypropylene (EPS). The padding 114 may comprise one or more types of material, such as one or more layers of deformable material. Furthermore, the padding 114 can be covered by an outer layer, such as a flexible material layer, such as a polycarbonate-based material.

In some examples, the padding 114 is also installed on a payload that is to be delivered by the UAV 100. For example, the padding 114 can be installed on a portion of the payload, such as the underside of a package payload that might come into contact with the colliding entity. As will be noted from at least FIGS. 1 and 2, in some examples, the body 102 of the UAV 100 comprises a payload container 120, configured to receive and house a payload during flight. The walls of the payload container 120 can also be constructed from deformable padding material to provide protection in the event of a collision during an unexpected descent.

Figure 3:
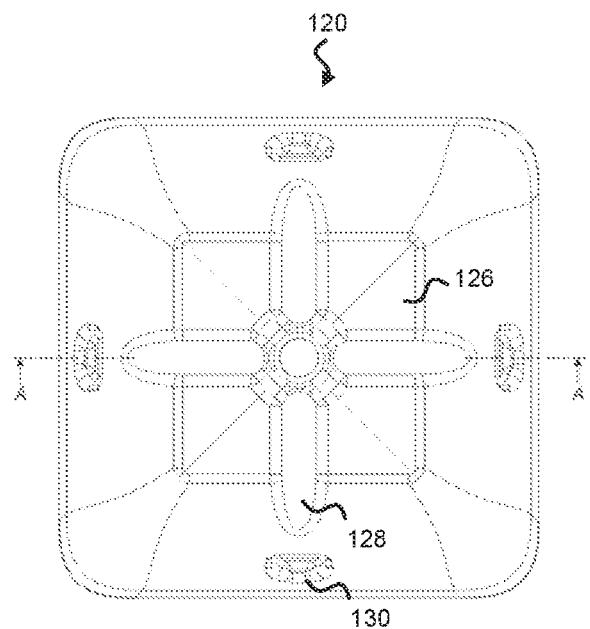
FIG. 3 is a plan view of a payload container in accordance with an example.
Figure 4:
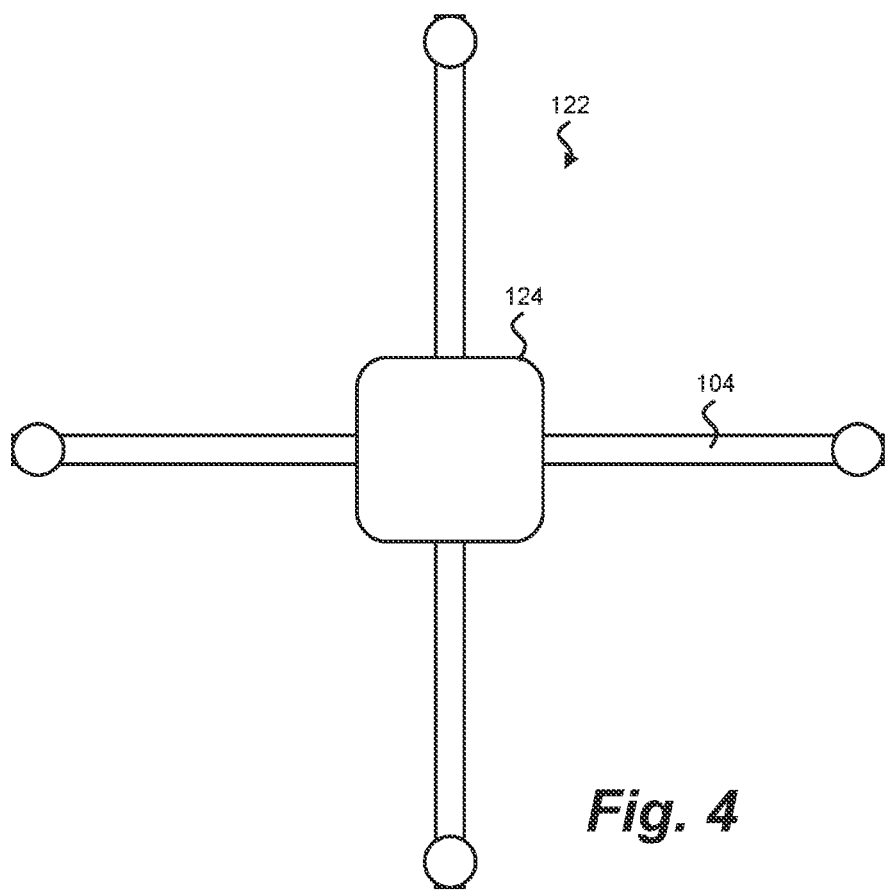
FIG. 4 is a plan view of a chassis of an unmanned aerial vehicle in accordance with an example.

FIG. 3 depicts a plan view of the payload container 120. FIG. 4 depicts a plan view of a chassis 122 of the UAV 100. The chassis 122 comprises a base 124 and a plurality of rigid support structures 104, such as those described above with reference to FIG. 1, attached thereto. The base 124 may comprise two layers of material with the rigid support structures 104 sandwiched between the two layers and fixed in place. In other examples, the chassis may be a unitary entity. The base 124 of the chassis 122 is configured to rest upon the top surface 126 of the payload container 120. In some examples the top surface 126 is recessed to receive the base 124.

Figure 5:
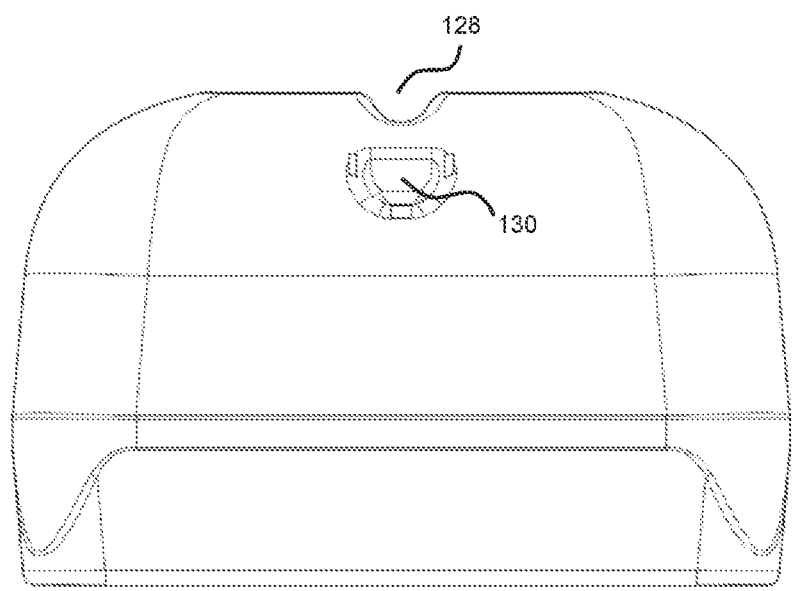
FIG. 5 is a side vie of the payload container of FIG. 3.
Figure 6:
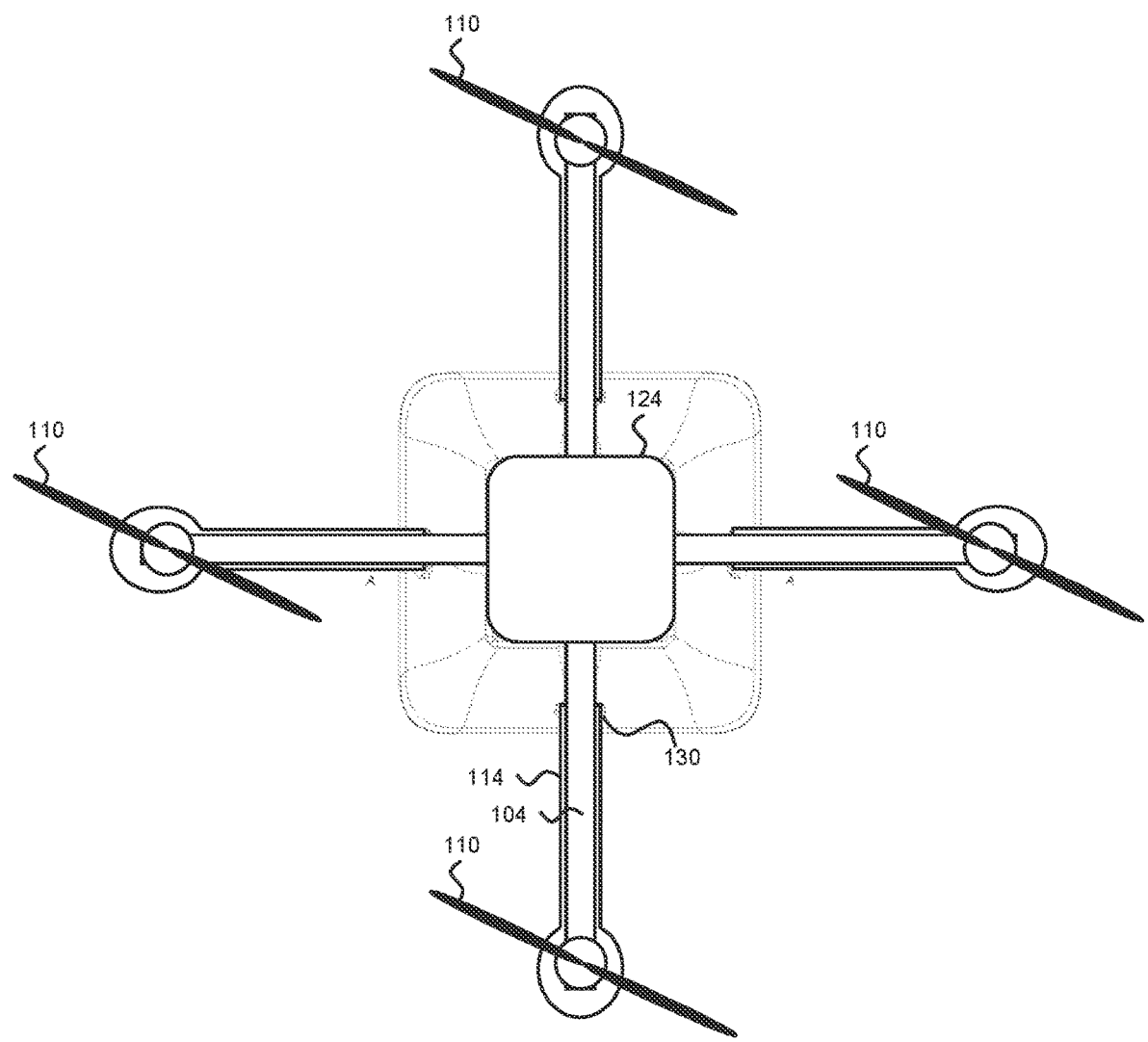
FIG. 6 is a plan view of the chassis of FIG. 4 mounted on the payload container of FIG. 3.

In this example, the payload container 120 comprises a plurality of elongate channels 128 configured to receive either an underside of a respective rigid support structure 104 and/or an underside of respective padding 114. The channels 128 extend outwards from the centre of the payload container 120. The payload container 120 also comprises a plurality of indents 130 configured to support an underside of the padding 114 once attached to the rigid support structures 104. FIG. 5 shows a side view of the payload container 120, while FIG. 6 depicts a plan view of the chassis 122 mounted on the top surface 126 of the payload container 120. Padding 114 is also shown affixed to an underside of the rigid support structures 104. In this example the padding 114 terminates at, and rests upon, the indents 130; however in other examples at least a portion of the padding 114 may extend further towards the base 124 of the chassis 122.

Figure 7:
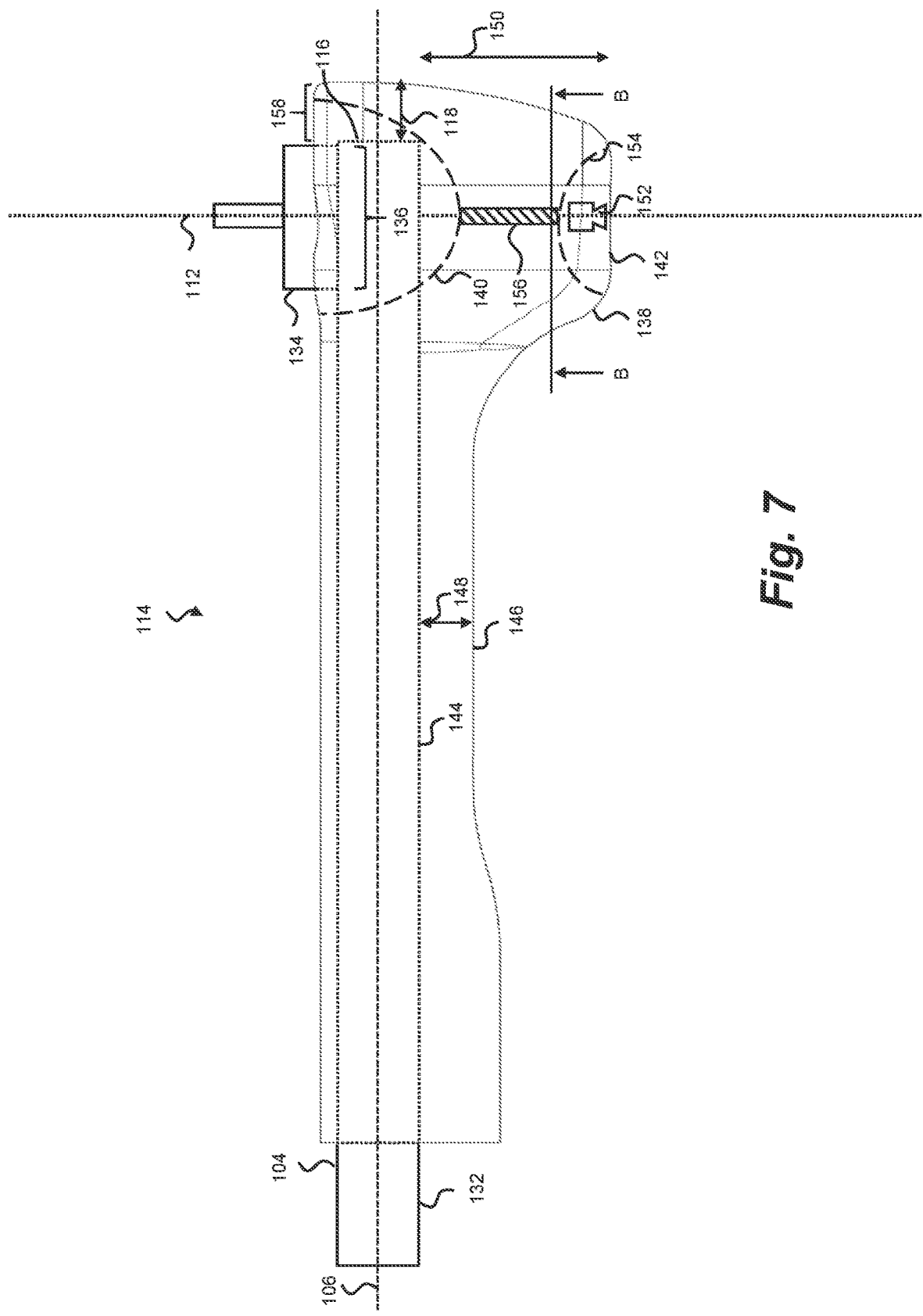
FIG. 7 is a partial cross section of padding covering at least a portion of a rigid support structure in accordance with an example.

FIG. 7 depicts a partial cross section of the padding 114 covering at least a portion of a rigid support structure 104. In this example the padding 114 entirely surrounds the outer perimeter of the rigid support structure 104, but it will be appreciated that in other examples the padding may partially surround the outer circumference of the rigid support structure 104. FIG. 7 shows that along a length of the rigid support structure 104 and in a direction parallel to the support axis 106, the padding 114 comprises a padding portion which is located on an underside 132 of the rigid support structure 104.

As described in relation to FIG. 1, the rotor blade assembly 108 comprises a motor housing 134, which comprises a motor configured to cause the rotor blades 110 to rotate about the rotational axis 112. The motor housing 134 can therefore be said to define the rotational axis 112. The motor housing 134 is attached and mounted to a section of the rigid support structure 104 known as a mounting section 136. The motor housing 134 may be bolted or welded, for example, either directly or indirectly onto the mounting section 136 of the rigid support structure 104. In FIG. 7, the motor housing 134 is shown to be partially exposed above the upper surface of the padding 114 and so is partially received within a recess 140 of the padding (shown depicted with a dashed line). In other examples, the motor housing 134 may be fully received within the recess 140 of the padding 114 or may be covered by other external components of the rotor blade assembly 108. The recess 140 may also house other components of the UAV 100, such as wires, antennae and/or circuitry.

In this example the mounting section 136 is located towards a distal end of the rigid support structure 104, i.e. at a point away from the body 102. Due to the concentrated weight of the motor housing 134, the padding 114 comprises a mounting section portion 138 positioned at least directly below the motor housing 134 to provide protection against impact with the motor housing 134. With reference to FIG. 7, the mounting section portion 138, when taken in cross-section in the plane B-B, is substantially concentric with the rotational axis 112. In other words, an axis defined by the mounting section portion 138 is substantially parallel to, and aligned with, the rotational axis 112, as well as being substantially perpendicular to the support axis 106. In other examples, however, the mounting section portion 138 can define an axis which is disposed at another angle relative to the support axis 106.

The mounting section portion 138 has an outer profile which generally narrows and tapers towards a lower surface 142 of the mounting section portion 138. In one example, the width of the mounting section portion 138 tapers in one dimension, such as in a single dimension parallel to the support axis 106, or in a single dimension perpendicular to both the support axis 106 and rotational axis 112. In another example, the width of the mounting section portion 138 tapers in both said dimensions.

In addition to a mounting section 136, the support structure 104 further comprises an elongate mid-section 144 which extends between the body 102 and the mounting section 136. The padding 114 therefore further comprises an elongate portion 146 covering an underside of the elongate mid-section 144 to protect against damage from a collision with the elongate mid-section 144. In FIG. 7, the elongate mid-section 144 of the padding 114 varies in depth along its length; however, in other examples the elongate mid-section 144 may have a constant depth along its length. In one example the depth of the elongate mid-section 144 may generally decrease as a function of distance away from the UAV's centre of mass.

As depicted in FIG. 7, the elongate mid-section 144 extends below the lower surface 132 of the rigid support structure 104 by a first depth dimension 148 and the mounting section portion 138 extends below the lower surface 132 of the rigid support structure 104 by a second depth dimension 150, where the second depth dimension 150 is greater than the first depth dimension 148. The first and second depth dimensions are measured in a direction parallel to the rotational axis 112. In examples where the elongate mid-section 144 has a varying thickness along its length, the first depth dimension 148 may be an average depth dimension of the elongate mid-section 144.

Some UAVs 100 carry one or more sensor devices 152 to record data during flight. Sensor devices 152 may include cameras, RADARs, LIDARs, etc. Embodiments advantageously accommodate such (a) sensor device(s) 152 within a recess 154 formed within the mounting section portion 138 of the padding 114. In this example, the recess 154 is located in a lower surface 142 of the mounting section portion 138 to ensure that the field of view of the e.g. downwards facing camera 152 is unobscured by the UAV 100. The recess 154, depicted by dashed lines, and the camera 152 are substantially coaxial with the rotational axis 112 to ensure stability during imaging. An aperture 156 also extends through the mounting section portion 138 to allow the passage of wires (not shown). In the example depicted, the aperture 138 extends between the upper and lower recesses 140, 154; however, the upper recess 140 may not always be present, so the aperture 156 may extend generally toward the rigid support structure 104. Any wires may then pass through or along the rigid support structure 104 towards the body 102 of the UAV 100.

The padding 114 depicted in FIG. 7 also includes an outer padding portion 158 which extends beyond a rigid surface 116 located at the distal end of the rigid support structure 104. The rigid surface 116 faces away from the body 102 of the UAV 100 and points outwards. The outer padding portion 158 therefore extends beyond the distal end of the rigid support structure 104, such that, in the event of lateral impact, it is the outer padding portion 158 that initially contacts a colliding entity, deforms upon impact, and absorbs energy during the collision. In this way the outer padding portion 158 limits and reduces damage caused during such lateral collisions.

The outer padding portion 158 has a thickness 118, measured in the direction along the support axis 106. The thickness 118 can be chosen depending upon various factors, such as rigidity of the support structure 104, average velocity of the UAV 100 during flight, mass of the UAV 100, etc. However, it has been realised that if the thickness 118 is too great, aerodynamics of the UAV can be compromised to an unacceptable level. The thickness may be around 5 cm, 10 cm, 15 cm, or 20 cm, for example.

In practical terms, the rotor blades 110 do little damage during a collision with an aerial vehicle when compared to an exposed rigid support structure 104. Thus, in the present example, a free end of the rotor blades 110 extends beyond the outer padding portion 158 in the direction parallel to the support axis 106.

Figure 8:
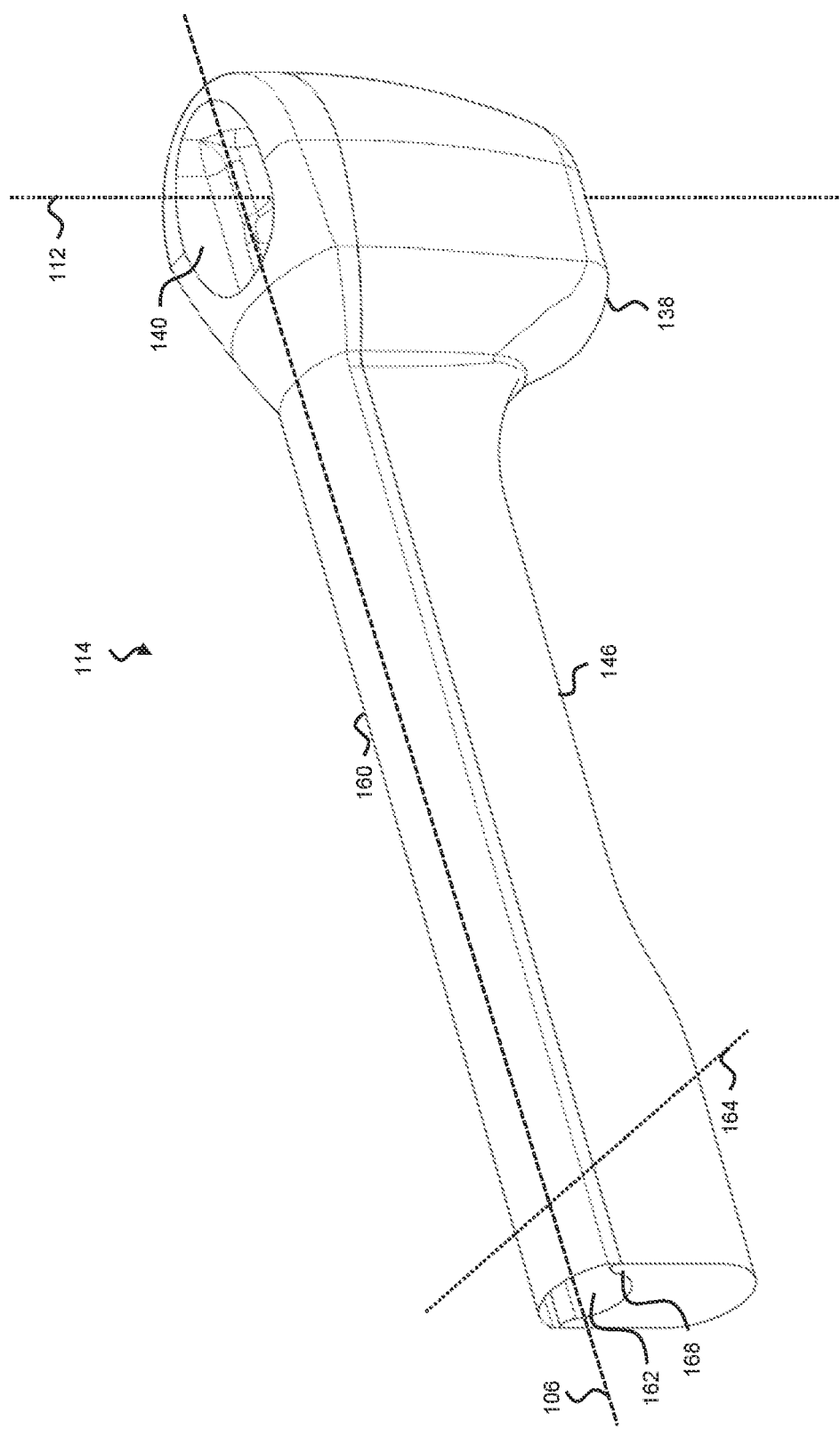
FIG. 8 is a perspective view of the padding of FIG. 7.

FIG. 8 depicts a perspective view of the padding 114 separated from the rigid support structure 104. The padding 114 comprises an upper portion 160, which would be located above an upper surface of a rigid support structure 104 when the support structure 104 is in position within the padding 114. The upper portion 160 may have a thickness which is less than the thickness of the padding 114 located on an underside of the rigid support structure 104 because, in general, the UAV 100 falls towards the ground with the underside of the UAV 100 facing downwards. It is therefore less critical to pad the upper surfaces of the rigid support structure 104.

In some examples, the upper portion 160 of the padding may not comprise any padding material, but instead forms an attachment mechanism to secure the padding 114 to the rigid support structure 104. For example, the upper portion 160 of the padding 114 may comprise one or more straps, hook and loop fasteners, tape or the like, to hold the padding 114 in place.

The upper portion 160 of the padding 114 may be releasable and be folded over to one side to allow the rigid support structure 104 to be placed upon the padding, before securing the upper portion 160 around the rigid support structure 104. In another example however, the upper portion 160 may not be releasable, and the padding 114 defines a space or cavity 162 to permanently receive the rigid support structure 104. The components of the rotor blade assembly 108 can be attached to the mounting section 136 of the rigid support structure 104 via the upper recess 140 once the rigid support structure 104 has been inserted into the sleeve-like padding 114. An internal surface of the padding 114 therefore conforms to a portion of an outer surface of the rigid support structure 104.

FIG. 8 also depicts a lateral padding portion 168, which covers at least a portion of a lateral surface of the rigid support structure 104. The lateral padding portion 168 extends around and conforms to the lateral surface of the rigid support structure 104 to provide protection during impact with the UAV 100 in cases where the UAV 100 has a component of lateral motion.

As described in relation to FIG. 7, the mounting section portion 138 tapers downwards (in the direction of the rotational axis 112) towards its lower surface. FIG. 8 depicts more clearly the tapering occurring in two dimensions. The width of the mounting section portion 138 narrows in both the directions of the support axis 106 and the axis 164. Axis 164 is arranged perpendicular to both the support axis 106 and the rotational axis 112. FIG. 8 also depicts the elongate portion 146 tapering downwards towards its lower surface. For example, the width of the elongate portion 146, measured in the direction of the axis 164, generally decreases in the downwards direction. The tapering profile reduces weight and minimises the drag incurred by padding on the UAV 100.

Figure 9:
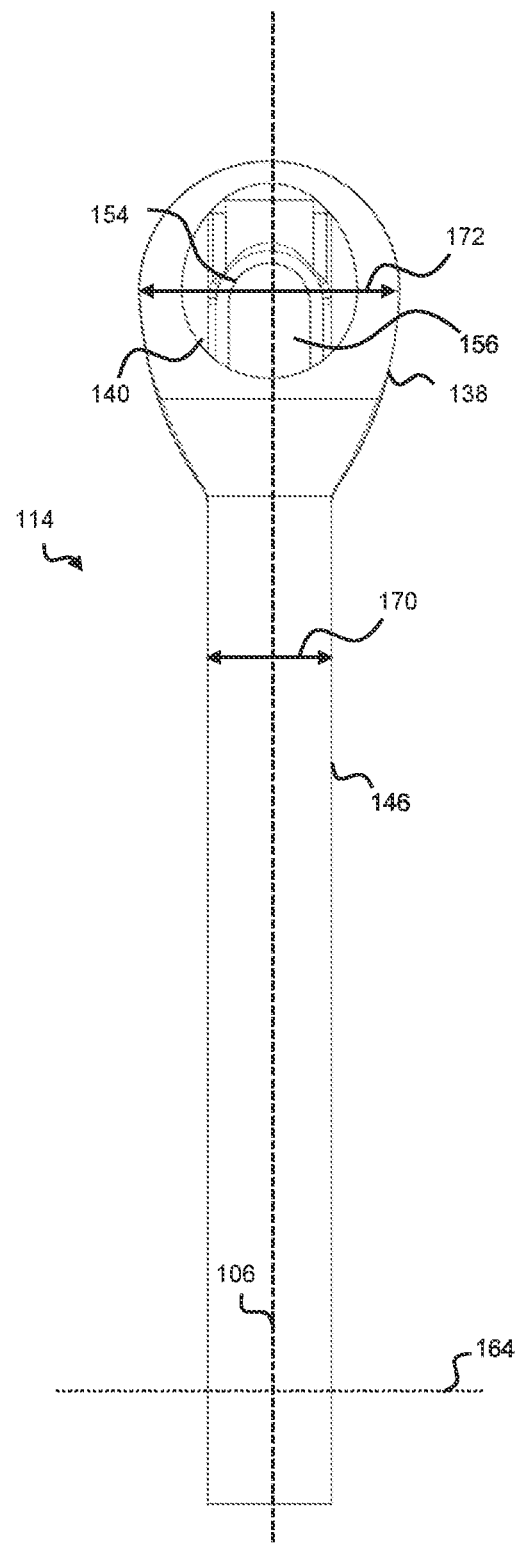
FIG. 9 is a plan view of the padding of FIG. 7 facing in a downwards direction.

FIG. 9 depicts a plan view of the padding 114 facing in the downwards direction. As can be seen, the elongate portion 146 has a first width dimension 170 and the mounting section portion 138 has a second width dimension 172, where the second width dimension 172 is greater than the first width dimension 170. The first and second width dimensions are measured in a direction perpendicular to both the rotational axis 112 and the support axis 106 (i.e. in the direction parallel to axis 164). By varying the width of the padding 114 along its length, protection can be provided where it is most needed, while reducing mass. The padding 114 is therefore wider at the location where the rotor blade assembly 108 is mounted onto the rigid support structure 104.

As described in relation to FIG. 7, an aperture 156 extends through the mounting section portion 138 generally in a direction along the rotational axis 112. The aperture 156 depicted in FIG. 9 is wider than that depicted in FIG. 7 to the extent that the upper recess 140, the aperture 156 and the lower recess 154 become a single void within the padding 114. The distal end of the rigid support structure 104 may terminate within the upper recess 140. In some examples there is a gap or spacing between the distal end of the rigid support structure 104 and the inner surface of the upper recess 140; however, in other examples the rigid surface 116 of the rigid support structure 104 abuts the inner surface of the padding. A gap or spacing may be provided to allow the outer padding portion 158 to deform and buckle upon impact with an entity.

Figure 10:
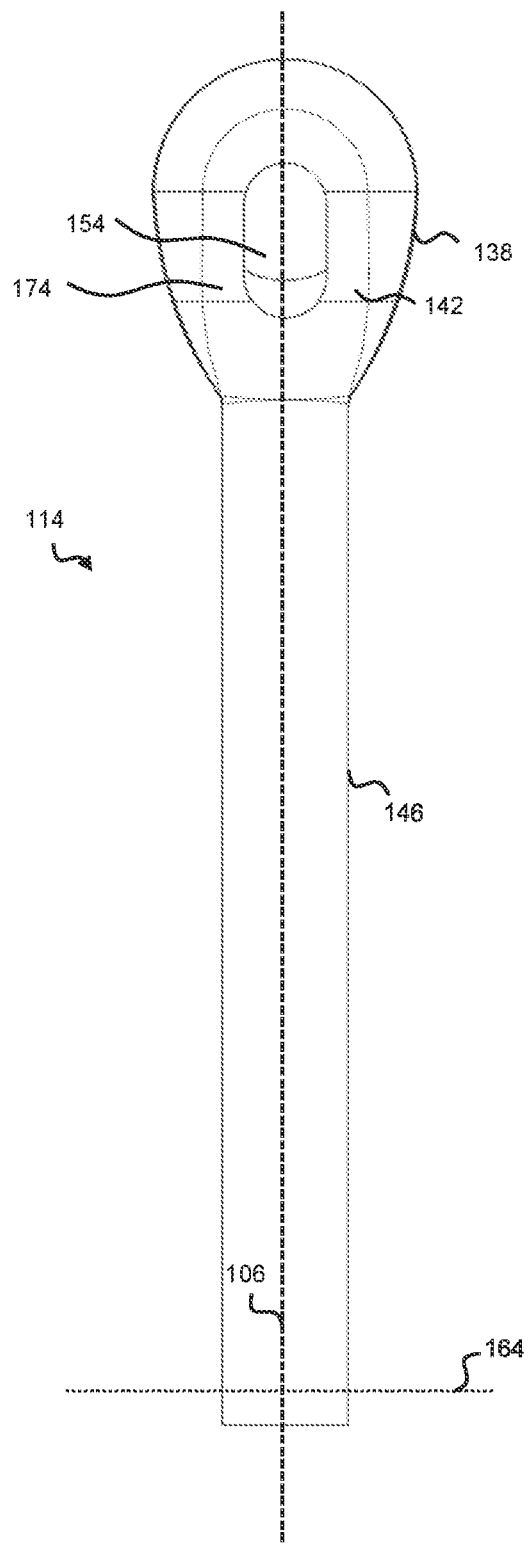
FIG. 10 is a plan view of the padding of FIG. 9 facing in an upwards direction.
Figure 11:
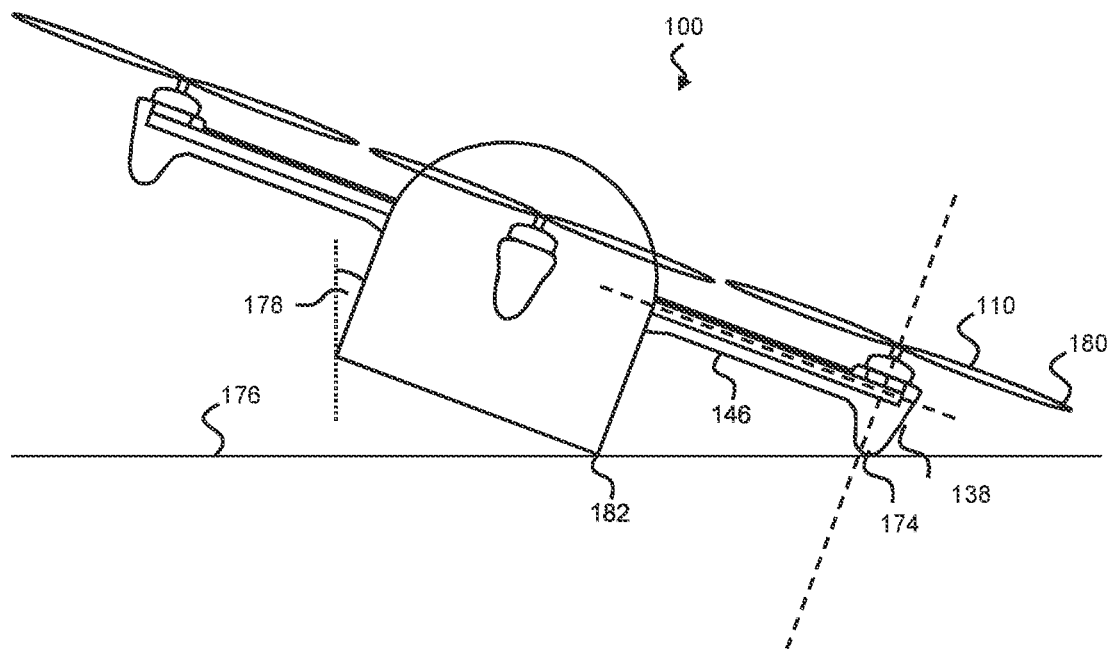
FIG. 11 is a side view of an unmanned aerial vehicle rotated about a tipping axis, in accordance with an example.

FIG. 10 depicts a view of the padding 114 facing in the upwards direction. The lower surface 142 of the mounting section portion 138 is visible. In some examples, the mounting section portion 138 of the padding 114 extends below the lower surface 132 of the rigid support structure 104 to an extent that it provides a stabilising portion 174. The stabilising portion 174, described in more detail in FIG. 11, is configured to contact a surface, such as the ground, to stop the rotor blades 110 from engaging the surface. In some examples the lower surface 142 and the stabilising portion 174 are the same surface.

FIG. 11 depicts a side view of the UAV 100 after landing on a ground surface 176. The UAV 100 has rotated about a tipping axis, which extends into the page, by an angle 178 so that the stabilising portion 174 contacts the ground 176. For example, the UAV 100 may have rotated beyond a tipping point, i.e. the point at which the UAV 100 will no longer return to an upright equilibrium position if displaced. Without the mounting section portion 138, the free ends 180 of the rotor blades 110 would engage the ground 176. To avoid this, the mounting section portion 138 is configured to extend below the underside of the rigid support structure 104 by a depth dimension sufficient to protect the rotor blades 110. It can be said that to avoid the free ends 180 of the rotor blades 110 from contacting the ground 176, a free end 180 of the rotor blade 110 does not bisect a tangent that extends between a contacting portion 182 of the UAV 100 and the stabilising portion 174.

In the example depicted, the stabilising portion 174 is part of the mounting section portion 138; however, in other examples the stabilising portion 174 may be part of the elongate portion 146 of the padding 114. In that case, the depth of the padding would need to be greater to ensure the free ends 180 of the rotor blades 110 do not contact the ground 176.

Figure 12:
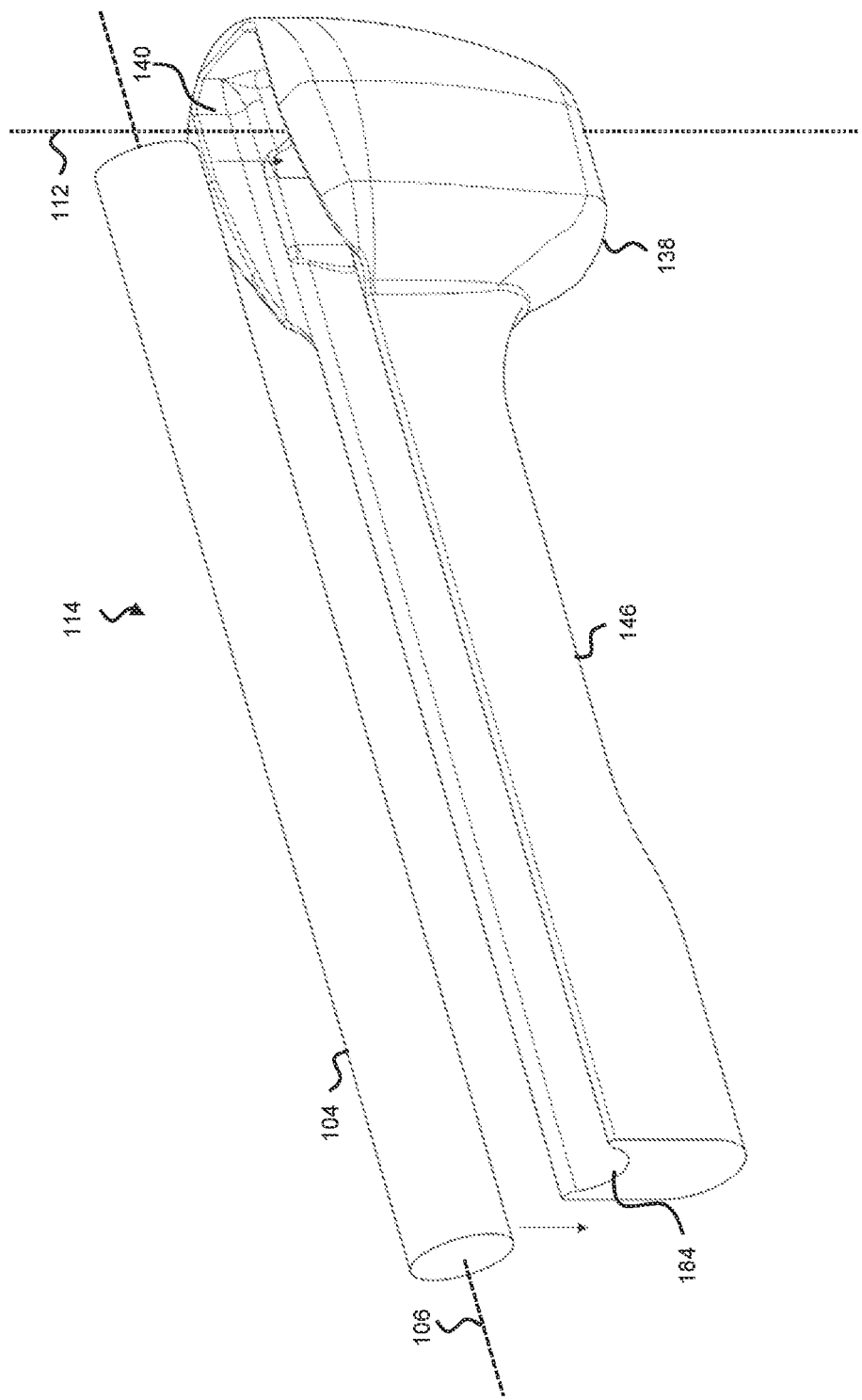
FIG. 12 is a perspective view of padding in accordance with another example.
Figure 13:
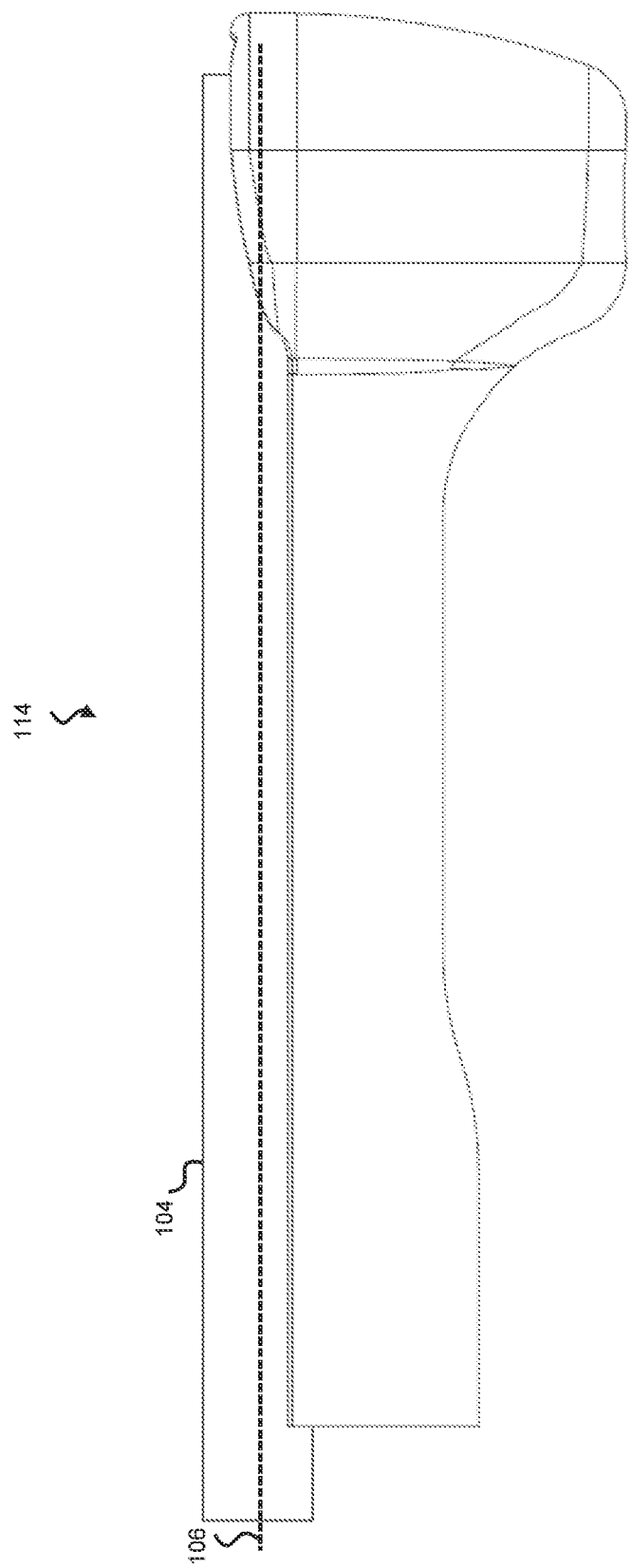
FIG. 13 is a side view of the padding of FIG. 12.

FIG. 12 depicts an exploded diagram of the padding 114 and the rigid support structure 104. The padding 114, in this example, is substantially similar to the padding described in previous figures. In this example, however, the padding 114 defines a channel or conduit 184 within which the rigid support structure 104 is partially received. The padding 114 therefore conforms to a portion of the outer surface of the rigid support structure 104. Once inserted into the channel 184, the padding 114 and rigid support structure 104 can be surrounded and covered by an outer layer of material (not shown). The outer layer of material may be made from a flexible material, such as a polycarbonate sheet. FIG. 13 depicts a side view of the padding 114 after the rigid support structure 104 has been disposed within the channel 184.

Figure 14:
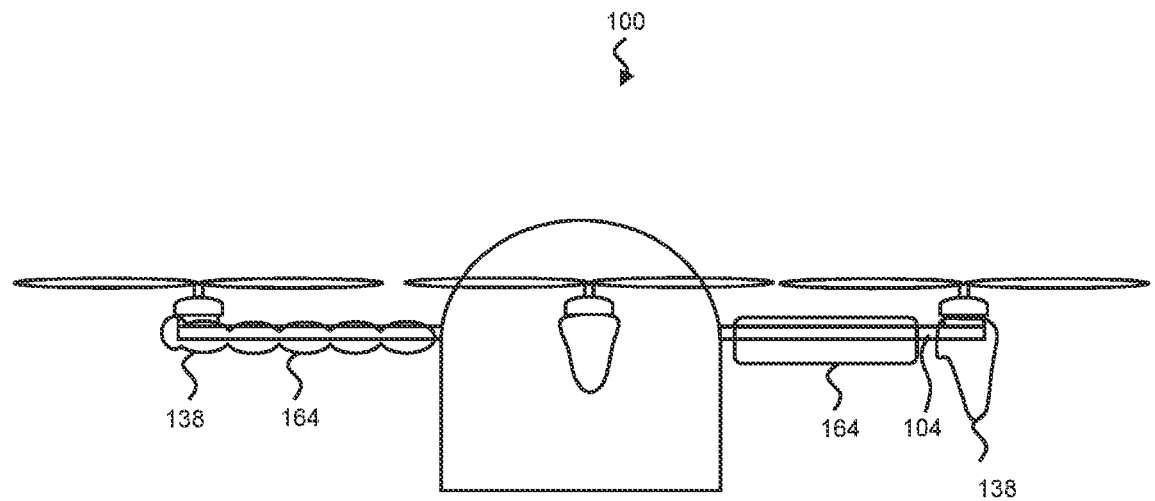
FIG. 14 is a side view of an unmanned aerial vehicle in accordance with another example.
Figure 15:
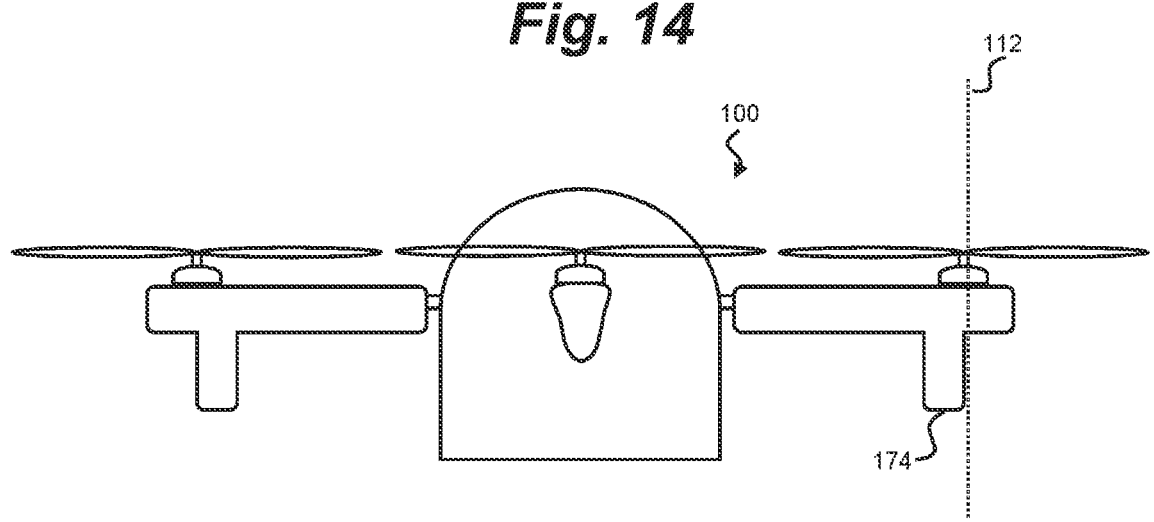
FIG. 15 is a side view of an unmanned aerial vehicle in accordance with another example.

FIGS. 14 and 15 depict side views of a UAV 100 comprising a passive safety system in accordance with another example. In one example of FIG. 14, the elongate portion 164 and the mounting section portion 138 of the padding 114 on the right-hand side of the UAV 100 form separate parts that are separated by a gap. In the gap, the rigid support structure 104 is exposed; the gap may be less than about 5 cm, to ensure the exposed section of the rigid support structure 104 does not directly impact a human should the UAV 100 experience an unexpected descent.

In another example, the elongate portion 164 and the mounting section portion 138 of the padding 114 on the left-hand side are unitary but comprise an undulating outer profile.

In the example of FIG. 15, the elongate portion 164 and the mounting section portion 138 of the padding 114 are unitary, and a portion of the padding 114 extending below the lower surface of the rigid support member 104 comprises a stabilising portion 174 that is offset from the rotational axis 112. In this case, unlike the example of FIG. 7, the stabilising portion 174 does not form part of a mounting section portion. It can nevertheless perform the stabilising function described above, if, for example, it conforms to the aforementioned geometrical condition, namely that a free end 180 of the rotor blade 110 does not bisect a tangent that extends between a contacting portion 182 of the UAV 100 and the stabilising portion 174.

In another embodiment, the padding may be replaced by or combined with one or more airbags which are deployed when certain conditions/triggers are met. For example, each support structure may be provided with an airbag that is configured to deploy in response to a trigger. For example, an onboard controller, such as a processor, may trigger the deployment in response to detecting a loss of power, that the UAV has become unresponsive, is unable to maintain altitude, or has become damaged. In another example, a signal may be received by the UAV (from a remote source) which instructs the controller to trigger the deployment. The airbags may be deployed when an onboard sensor detects that a collision with another object, such as an airplane, is imminent.

The airbags may be mounted along an exterior surface of the support members. Alternatively, the airbags may be mounted at least partially within the support structure. Once deployed, the airbag may inflate through an aperture formed in the support structure. Such a design improves aerodynamics by reducing drag.

The airbags may be arranged such that they envelope at least a portion of the exterior surface of the UAV and/or a rotor blade assembly upon deployment. For example, the airbags may be suitably arranged such that they envelope at least a portion of a support structure, an external camera, an external sensor, a package being carried by the UAV, a rotor blade motor and/or the rotor blades upon deployment.

Although the above embodiments describe padding which is deformable. In certain examples, the padding may not be deformable, but instead may be flexible.

The above embodiments are to be understood as illustrative examples. Further embodiments are envisaged. For example, the lower recess and corresponding sensor device may be located at any point along the length of the padding, and so is not necessarily located within the mounting section portion. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the disclosure, which is defined in the accompanying claims.

What is claimed is:

1. An unmanned aerial vehicle, UAV, comprising:
   a central body; and
   a plurality of support structures extending outwards from the central body,
   wherein each said support structure supports a rotor blade assembly, the rotor blade assembly defining a rotational axis of one or more rotor blades associated with the rotor blade assembly,
   wherein each said support structure is provided with one or more deformable portions,
   wherein the one or more rotor blades are mounted on an upper side of the support structure, wherein the one or more deformable portions comprise at least a padding portion which is located on an underside of the support structure,
wherein the rotor blade assembly comprises a motor housing defining the rotational axis and mounted in a mounting section of the support structure, and
wherein the padding portion comprises a mounting section portion located below the motor housing, the rotational axis passing through the mounting section portion, and wherein the mounting section portion comprises a recess formed therein, the recess housing at least a part of the motor housing, and wherein a rigid surface of the support structure terminates within the recess, the rigid surface being located at a distal end of the support structure.

2. The UAV of claim 1, wherein the one or more deformable portions are configured to cover at least a portion of the support structure.

3. The UAV of claim 1, wherein each said support structure comprises:
a rigid inner portion; and
a deformable portion.

4. The UAV of claim 1, wherein the mounting section portion has a cross-section which is substantially concentric with the rotational axis and has a profile which tapers downwards towards a lower surface of the mounting section portion.

5. The UAV of claim 1, wherein the mounting section is located at a distal end of the support structure and the support structure comprises an elongate mid-section connecting the central body to the mounting section, and wherein the padding comprises an elongate portion which is located on at least an underside of the elongate mid-section.

6. The UAV of claim 5, wherein the elongate portion extends below the lower surface of the support structure by a first depth dimension and the mounting section portion extends below the lower surface of the support structure by a second depth dimension, the first and second depth dimensions being measured in a direction parallel to the rotational axis, and wherein the second depth dimension is greater than the first depth dimension.

7. The UAV of claim 5, wherein:
the support structure extends outwards along a support axis which is substantially perpendicular to the rotational axis,
the elongate portion has a first width dimension and the mounting section portion has a second width dimension, the first and second width dimensions being measured in a direction perpendicular to both the rotational axis and the support axis, and
the second width dimension is greater than the first width dimension.

8. The UAV of claim 1, wherein the UAV comprises a sensor device, wherein the mounting section portion comprises a further recess formed therein, and the further recess houses the sensor device.

9. The UAV of claim 8, wherein the further recess is substantially coaxial with the rotational axis.

10. The UAV of claim 8, wherein an aperture extends through the mounting section portion.

11. The UAV claim 1, wherein the mounting section portion comprises a stabilising portion configured to engage a horizontal surface when the central body of the UAV is in contact with the horizontal surface and when the UAV is rotated about a tipping axis, thereby to inhibit the one or more rotor blades from engaging the horizontal surface.

12. The UAV of claim 1, wherein the support structure extends outwards along a support axis, and wherein the rigid surface faces away from the central body, and wherein and the one or more deformable portions comprise an outer deformable portion, the outer deformable portion extending beyond the rigid surface in a direction parallel to the support axis.

13. The UAV of claim 12, wherein the extension of the outer deformable portion beyond the surface has a thickness, measured parallel to the support axis, of less than 10 cm.

14. The UAV of claim 12, wherein a free end of each of the at least one rotor blade extends beyond the outer deformable portion in the direction parallel to the support axis.

15. The UAV of claim 1, wherein the one or more deformable portions comprise an inner deformable layer formed of a deformable material and an outer layer formed of a flexible material.

16. The UAV of claim 1, wherein the one or more deformable portions cover at least a portion of a lateral surface of the support structure.

17. The UAV of claim 1, wherein a surface of the one or more deformable portions conforms to a portion of an outer surface of the support structure.

18. The UAV of claim 1, comprising:
at least one airbag configured to envelope at least a portion of an exterior surface of the UAV upon deployment.

19. The UAV of claim 18, wherein the at least one airbag is arranged to envelope at least a portion of the support structure upon deployment.

20. The UAV of claim 18, wherein the at least one airbag is arranged to envelope at least a portion of the rotor blade assembly upon deployment.

21. The UAV of claim 1, wherein the one or more deformable portions are reusable.

* * * * *